(12) United States Patent
Mohajeri

(10) Patent No.: US 6,728,368 B1
(45) Date of Patent: Apr. 27, 2004

(54) APPARATUS AND METHOD FOR A HIGHLY EFFICIENT LOW POWER DRIVER FOR A CENTRAL OFFICE ADSL SYSTEM

(75) Inventor: Hessam Mohajeri, Los Altos Hills, CA (US)

(73) Assignee: Centillium Communications, Inc., Fremont, CA (US)

(*) Notice: Subject to any disclaimer, the term of this patent is extended or adjusted under 35 U.S.C. 154(b) by 717 days.

(21) Appl. No.: 09/707,570

(22) Filed: Nov. 6, 2000

(51) Int. Cl.[7] .............................. H04M 1/00; H04M 3/00
(52) U.S. Cl. ............. 379/377; 379/406.01; 379/387.02; 379/398; 379/402; 379/416; 379/399.01; 375/232; 375/220; 375/238; 375/288; 370/493
(58) Field of Search ................... 379/406.01–406.16, 379/387.02, 394, 398, 402, 416, 377, 399.01, 400, 401, 413.01, 322–324; 370/480, 485–487, 489, 490, 493; 375/232, 220, 238, 288, 294, 221, 222

(56) References Cited

U.S. PATENT DOCUMENTS

| | | | |
|---|---|---|---|
| 4,558,187 A | * 12/1985 | Billi et al. | 379/402 |
| 5,153,466 A | 10/1992 | Stein et al. | 307/475 |
| 5,157,690 A | * 10/1992 | Buttle | 375/232 |
| 5,325,395 A | 6/1994 | Tran | 375/7 |
| 5,579,336 A | * 11/1996 | Fitzgerald et al. | 375/219 |
| 5,825,819 A | 10/1998 | Cogburn | 375/257 |
| 5,838,722 A | 11/1998 | Consi | 375/219 |
| 6,421,320 B1 | * 7/2002 | Betts | 370/236 |
| 6,480,532 B1 | * 11/2002 | Vareljian | 375/222 |

* cited by examiner

Primary Examiner—Duc Nguyen
Assistant Examiner—Alexander Jamal
(74) Attorney, Agent, or Firm—Fenwick & West LLP

(57) ABSTRACT

An apparatus and method to implement a highly efficient low power line driver. In a first embodiment, the invention provides a method to increase the power efficiency of a line driver. The method includes supplying a digital signal processor output to a first subtractor; supplying the first subtractor output as an input to a modulator of a line driver; subtracting the line driver output from the digital signal processor output at the first subtractor; filtering the line driver output with a low pass filter; routing the line driver output to an impedance match filter; providing a first analog-to-digital converter and a second subtractor to subtract the line impedance match filter output from the low pass filter output; providing a digital filter and a second analog-to-digital converter; and subtracting the digital filter output from the first analog-to-digital converter output at a third subtractor to output a feedback signal to the digital signal processor. In a second embodiment, the invention provides an ADSL system with a line driver. The system line driver includes a first subtractor; a digital signal processor to supply a signal to the first subtractor; a line driver receiving an input from the first subtractor, wherein a first closed loop path is provided from the line driver output to the first subtractor; a line impedance match filter receiving the line driver output as an input; a low pass filter, receiving the line driver output as an input; a second subtractor circuit to subtract the line impedance match filter output from the low pass filter output, wherein the second subtractor provides an input to a first analog-to-digital converter; a second analog-to-digital converter; a digital filter to receive an input from the second analog-to-digital converter; and a third subtractor to subtract the digital filter output from the first analog-to-digital converter output, wherein the third subtractor produces a feedback input signal to the digital signal processor.

20 Claims, 8 Drawing Sheets

APPARATUS AND METHOD FOR A HIGHLY EFFICIENT LOW POWER DRIVER FOR A CENTRAL OFFICE ADSL SYSTEM

BACKGROUND OF THE INVENTION

1. Field of the Invention

This invention relates generally to a Class-D line driver, and, and in particular to an improved Class-D line driver for Asymmetric Digital Subscriber Line (ADSL) applications.

2. Background of the Invention

Recently, broadband network applications are increasingly being implemented on digital subscriber lines (DSL), especially on asymmetric digital subscriber lines (ADSL). ADSL has proven to be a preferred technology, since ADSL delivers a good bit rate at low cost to the resident.

ADSL is a new technology that allows more data to be sent over existing copper telephone lines that are used for plain old telephone service (POTS). Unlike cable modem technology, ADSL does not require any costly improvements to the telephone lines. ADSL supports data rates of approximately 1.5 megabits per second (Mbps) to 9 Mbps when receiving data (known as the downstream rate), and supports data rates of approximately 16 kilobits per second (Kbps) to 640 Kbps when sending data (known as the upstream rate). ADSL requires a modified ADSL modem, but the modifications are minor.

ADSL line coding is DMT (Discrete Multi-Tone). DMT line coding consists of 256 carriers that can individually transmit and receive data. This type of line coding is resistant to channel noise, and individual carriers in the noisy part of the channel can be turned off. However, DMT line code has a high Peak-to-Average Ratio (PAR). The large PAR is due to the fact that the addition of 256 carriers at random creates a random signal with an even larger distribution. The high PAR requires line drivers that can supply large peaks of power on demand. The average PAR for a DMT signal is approximately 5.4.

Almost all current line drivers that are presently used for ADSL are linear line drivers with AB output stages. These types of line drivers have very low power efficiencies. The best prior art linear line driver for ADSL transmission from a Central Office (CO) has approximately a 10% power efficiency, which means it dissipates approximately one watt of power for every 100 milliwatts delivered to the load.

The other major requirements for ADSL line drivers are low noise and low distortion. Since the received signal at a remote office at a long distance from the CO is weak, and the transmitted power is large, any distortion on the part of the line driver will corrupt the received signal.

A typical pulse-width-modulation ("PWM") type line driver (i.e., the Class-D line driver) includes a comparator circuit coupled to the gates (or bases) of a pair of switching transistors that are coupled in series across a D. C. power source. The transistors are disposed in a conventional push-pull configuration. Reverse current bypass or recovery diodes are also coupled in series across the D. C. power source, and the junction of the diodes is coupled to the junction of the paired transistors. A low-pass filter is coupled to the junction of the paired transistors.

The comparator creates a rectangle-wave PWM signal from a modulating input signal and a triangle-wave carrier signal. The PWM signal is applied to the gates of the switching transistors, causing the transistors to be alternately switched on and off in accordance with the duration of the PWM pulses. The resulting demodulated signal passes through the low-pass filter and is output to a load.

Although highly power efficient compared to linear drivers, conventional Class-D line drivers are subject to output distortion. Class-D line drivers generate output distortion due to a mismatch in the output transistors.

An additional cause of output distortion in conventional Class-D line drivers is pulse amplitude error (i.e., crossover distortion) over the analog cycle of the modulating input signal. Class-D line drivers include a pair of switching transistors and recovery diodes. When an analog input signal passes from a positive to negative half cycle, effective output drive is transferred from one transistor and recovery diode to the other transistor and recovery diode. This transition creates a crossover distortion component in the output waveform resulting from recovery diode over-swings and forward voltage drops of the "on" transistor. Finally, Class-D line driver output is also subject to high-frequency ripple distortion created by the frequency of the carrier signal creating PWM waveforms.

FIG. 1 is a circuit diagram of a conventional Class-D line driver. A typical distortion level for the output of a conventional open loop Class-D line driver is 0.1%, which is not adequate for an ADSL modem application. The signal 102 is an input to the PWM block 104, which provides an output signal received as an input signal to the gates of transistors 106 and 108. The output from the drains of transistors 106 and 108 is connected through line 110 to load capacitance 112 and load resistance 114. The source of transistor 108 is connected to an appropriate bias voltage VDD. Load resistance 114, load capacitance 112, and the source of transistor 106 are connected to ground (GND).

FIG. 2 is a circuit diagram of a closed loop Class-D line driver. The signal 102 is an input to subtractor 202, which outputs a signal to a loop filter 204 that may optionally include a PWM. The output of loop filter 204 provides an output signal received as an input signal to the gates of transistors 106 and 108. The output signal from the drains of transistors 106 and 108 is connected through line 110 to load capacitance 112 and load resistance 114. The output signal of transistors 106 and 108 is also a feedback signal subtracted by subtractor 202. The source of transistor 108 is connected to an appropriate bias voltage VDD. Load resistance 114, load capacitance 112, and the source of transistor 106 are connected to ground (GND).

This circuit architecture has the benefit of canceling errors at the line driver output by the feedback loop. This type of circuit architecture can achieve −80 Decibels (dB) total harmonic distortion (THD) at low frequencies less than 20 kilohertz (KHz). This type of circuit architecture can achieve −60 dB at higher frequencies, but this is not adequate for ADSL applications.

Another choice for improving the linearity of the line driver is to use a replica line driver to remove the error. FIG. 3 is a circuit diagram of a replica line driver to remove the error from a Class-D line driver. The signal 102 is an input to line drivers 302 and 304. Line driver 302 provides an output signal that is an input signal to a subtractor 306. The output signal of line driver 304 is an input signal to load resistance 314 and subtractor 308, which subtracts the original signal 102. The output signal of subtractor 308 is an input signal to be subtracted from the output of line driver 302 by subtractor 306. Subtractor 306 provides the output signal to load resistance 312. Load resistance 312 and load resistance 314 are also connected to ground (GND).

This circuit architecture relies on the matching of the parameters of the line drivers to cancel errors in the output.

Matching of the line driver parameters is a difficult task, especially during large transient signals. Improvements on the lower frequency band are possible with this circuit architecture, but as the frequency of the input signal increases, this matching becomes less accurate. Parameters such as cross-over distortion are very difficult to cancel with this circuit architecture. Switch synchronization is also not possible for Class-D line drivers.

Another choice for improving the linearity of the line driver is to use analog adaptive filters to match the impedance characteristic of the line to the impedance of the line driver. FIG. 4 is a circuit diagram of a Class-D line driver with an analog adaptive filter 404. The signal 102 is an input to line driver 402. Line driver 402 provides an output signal that is an input signal to termination resistor 406 and to analog adaptive filter 404, both of which provide an input signal to subtractor 408, which subtracts the signal from termination resistor 406. Subtractor 408 provides a correction signal 412 to the source (not shown) that supplies the signal 102 to the line driver 402. The feedback of correction signal 412 helps to cancel the echo and distortion at the output of the line impedance 410. Line impedance 410 is connected to ground (GND).

The analog adaptive filter 404 simulates the line impedance and alleviates the distortion requirements of the line driver 402. However, implementing this analog adaptive filter 404 on an integrated circuit chip is a difficult task. The noise of this analog adaptive filter 404 needs to be low and this requires large capacitors and small resistors. Also the distortion of the analog adaptive filter 404 needs to be lower than the line driver 402. Another problem is that the time constant of the analog adaptive filter 404 needs to be low, and this also requires large capacitors that consume consider area on the chip. In the past, simple second order filters were implemented and performance gains of 10 dB were reported. Increasing the filter order is difficult and the power consumption can become too large. This type of circuit architecture is inadequate for ADSL applications.

Another choice for improving the linearity of the line driver is to use pre-distortion techniques to pre-distort the input signal by the inverse of the transfer function of the line driver, and then use this signal as the input to the line driver. FIG. 5 is a circuit diagram of a Class-D line driver with a pre-distortion circuit 502 to receive the input signal 102, which is distorted and output to the line driver 504. Line driver 504 outputs a signal 506 that is has little distortion compared to input signal 102.

A digital signal processor (DSP, not shown) constantly monitors the output of the line driver 504 and creates a table of pre-distortion functions. The data is then sent to the pre-distortion circuit 502. This is a very successful architecture and is used in high power radio-frequency transmission. However, this architecture is not suitable for a DSL system. On the transmitter side the THD is −60 dB and there is no need to improve this parameter. Since the transmit data rate is much higher than the receive data rate, the DSP has to work harder to remove the error for the whole transmit frequency band and not only the receive frequency band. This architecture is best suited for channels with constant impedance and not channels exhibiting transfer function nulls, because this architecture does not take into account any frequency dependence. Therefore, this architecture is only applicable to channels with narrow bandwidths (e.g., even 10 MHz of radio-frequency band on a 1 GHz carrier is considered to be a narrow band system).

Errors can be removed from the received signal by using a proper hybrid. The reduction of the error is entirely dependent on how well the impedance match of the line can be simulated by the filter. Since the line impedance varies depending on different loop characteristics, there is a limit on how much attenuation is possible. A simple hybrid attenuates echoes up to 10 dB. More elaborate hybrids can attenuate up to 24 dB.

The above description of line drivers illustrates some of the requirements of DSL and ADSL technology. What is needed is a highly efficient, low noise and low distortion line driver for driving DSL and ADSL lines. Moreover, such line drivers preferably should be relatively inexpensive (or at least not significantly more expensive than comparable existing line drivers).

SUMMARY OF THE INVENTION

The present invention provides a highly efficient, low noise and low distortion line driver for central office transmitters in ADSL applications.

The invention provides an improved line driver architecture. The invention can be implemented in numerous ways, such as a method, a system, an apparatus, and a program on electronic-readable media. Several aspects of the invention are described below.

In accordance with a first aspect of the invention, the invention provides a method to increase the power efficiency of a line driver. The method includes supplying an original input signal from a digital signal processor to a first subtractor circuit; supplying an output signal from the first subtractor circuit as an input signal to a modulator of a line driver having an output signal; providing a first closed loop path to subtract the output signal from the line driver from the original input signal of the first subtractor circuit; filtering the output signal from the line driver with a termination resistor and a low pass filter; routing the output signal from the line driver to a line impedance match filter; providing a second closed loop path including a first analog-to-digital converter and a second subtractor to subtract an output signal from the line impedance match filter from an output signal from the low pass filter; providing a third closed loop path including a digital filter and a second analog-to-digital converter; and subtracting an output signal of the digital filter from an output signal of the first analog-to-digital converter at a third subtractor circuit to output a feedback signal to the digital signal processor.

In accordance with a second aspect of the invention, the invention provides an ADSL system with a line driver. The line driver includes a first subtractor having a first input port, a second input port, and an output port producing an output signal; a digital signal processor to supply an original input signal to the first input port of the first subtractor; a Class-D line driver having an output signal on an output port and receiving an input signal to a modulator from the output signal of the first subtractor, wherein a first closed loop path is provided from said output port of the Class-D line driver to the second input port of the first subtractor; a line impedance match filter producing an output signal, receiving the output signal of the line driver as an input signal; a low pass filter having an output signal, receiving the output signal of the line driver as an input signal through a termination resistor; a second subtractor circuit to subtract the output signal from the line impedance match filter from the output signal received from the low pass filter, wherein the second subtractor provides an input signal to a first analog-to-digital converter with an input port and an output port; a second analog-to-digital converter with an input port and an output port; a digital filter with an output port and an input port to receive an input signal from the output port of the second analog-to-digital converter; and a third subtractor to subtract an output signal from the output port of the digital filter from an output signal from the output port of the first analog-to-digital converter, wherein the third subtractor outputs a feedback input signal to the digital signal processor.

These and other objects and advantages of the invention will become apparent to those skilled in the art from the following detailed description of the invention and the accompanying drawings.

BRIEF DESCRIPTION OF THE DRAWINGS

The foregoing and other objectives, aspects, and advantages will be better understood from the following detailed description of embodiments of the present invention with reference to the following drawings.

DETAILED DESCRIPTION OF THE PREFERRED EMBODIMENTS

Alternative embodiments of the invention can be implemented in several environments and applications (e.g., homes, offices, and so forth). The particular environment and application may result in a significantly different configuration than the configurations illustrated below. The advantages of the embodiments of the invention described below also apply to these other environments and applications.

The present advanced analog-to-digital converters (ADCs) can resolve up to 16 bits and higher in the 200 KHz frequency band. In preferred embodiments of the invention, the function of the hybrid can be done digitally using two ADCs and by implementing line impedance matching using digital filters. The digital filters are ideal for this, because they do not have any component tolerance issues, mismatch problems, and the digital filters can be made as complex as necessary for the application.

Figure 1:
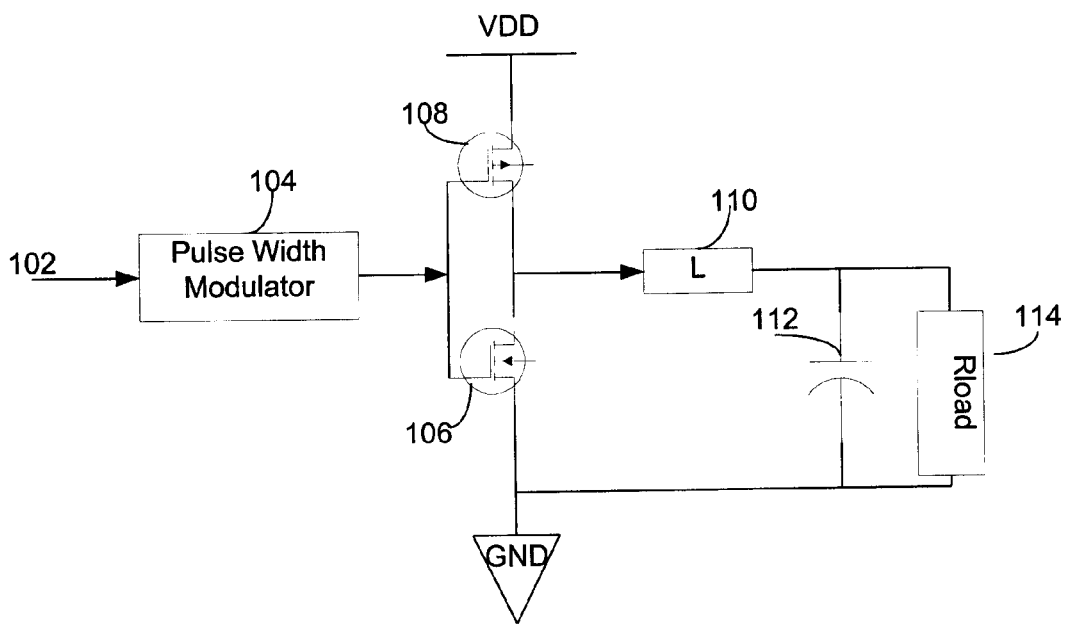
FIG. 1 is a circuit diagram of a conventional Class-D line driver.
Figure 2:
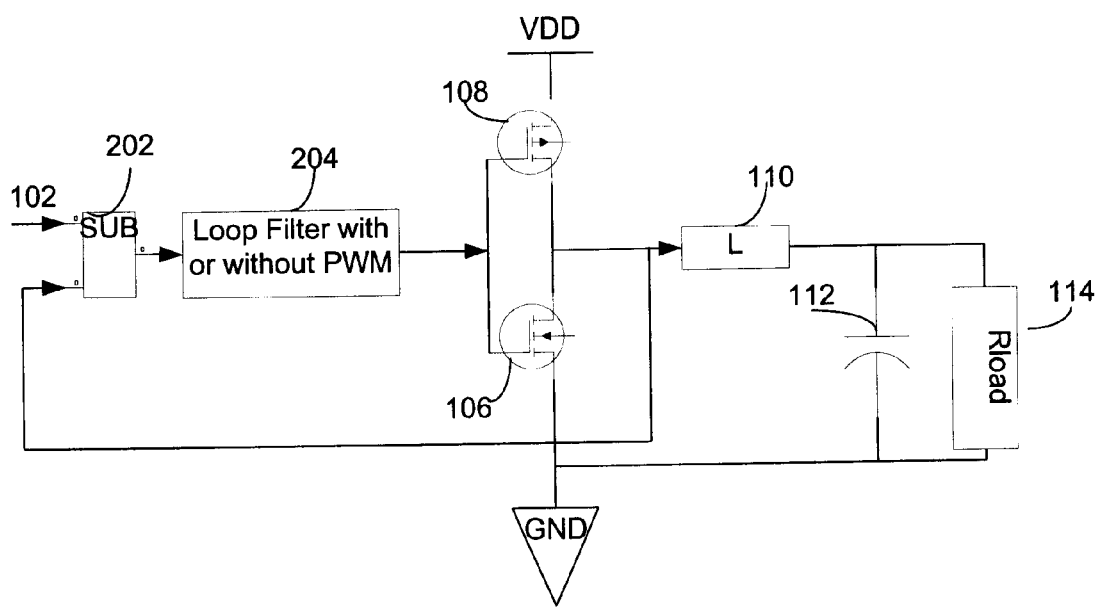
FIG. 2 is a circuit diagram of a closed loop Class-D line driver.
Figure 3:
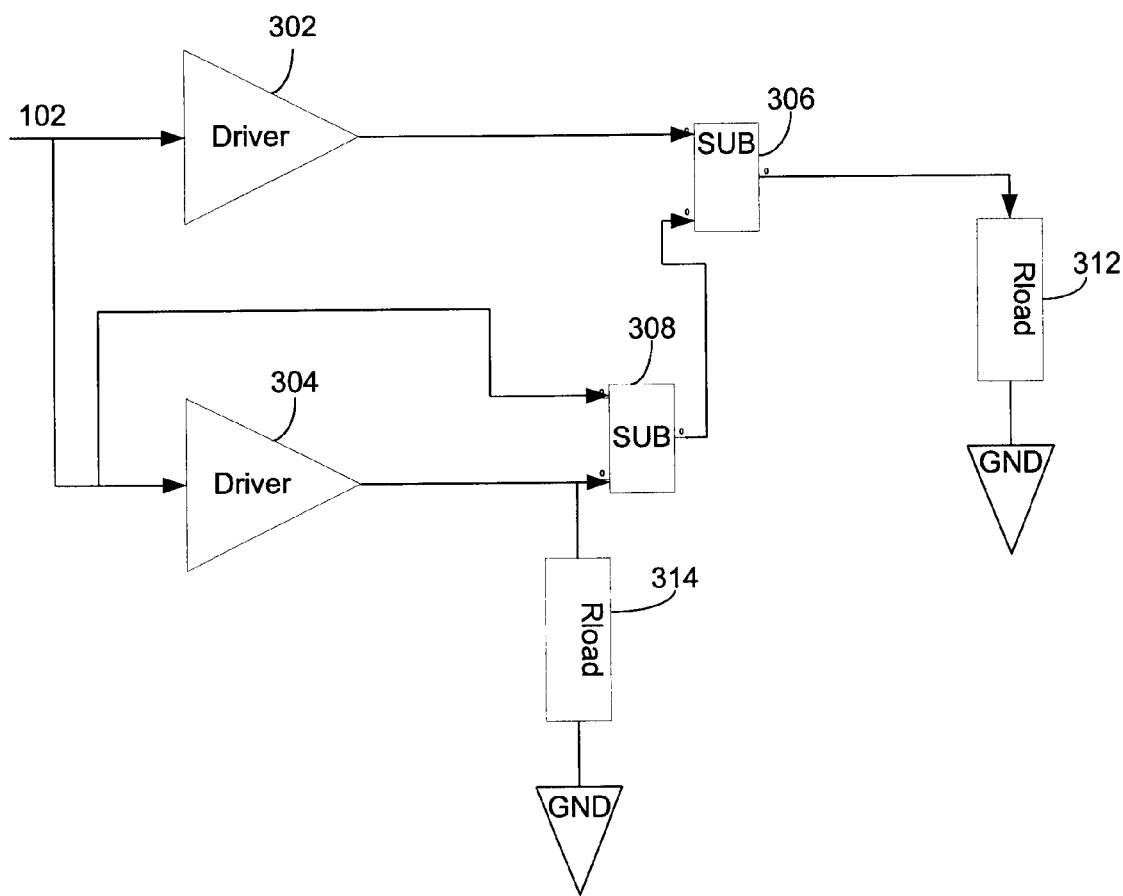
FIG. 3 is a circuit diagram of a replica line driver to remove the error from a Class-D line driver.
Figure 4:
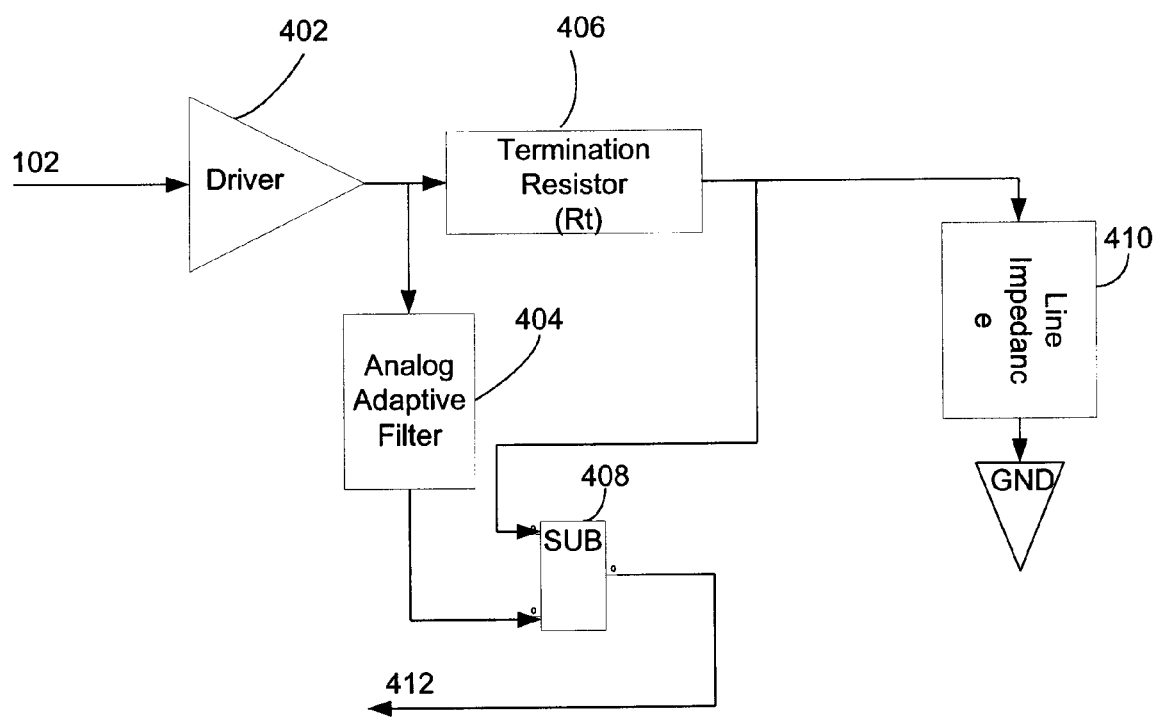
FIG. 4 is a circuit diagram of a Class-D line driver with an analog adaptive filter.
Figure 5:
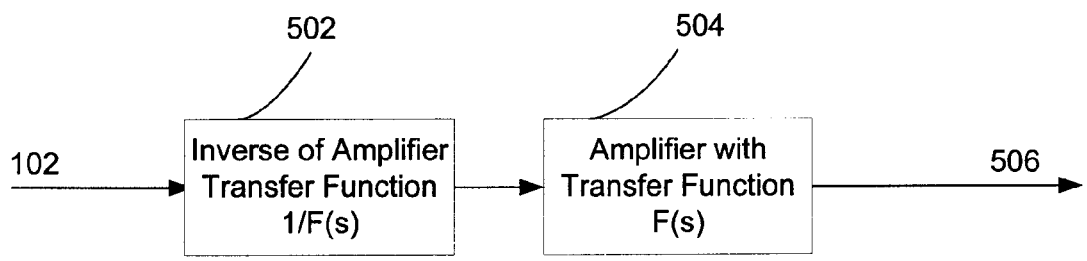
FIG. 5 is a circuit diagram of a Class-D line driver with a pre-distortion circuit to receive the input signal, which is distorted and output to the line driver.
Figure 6:
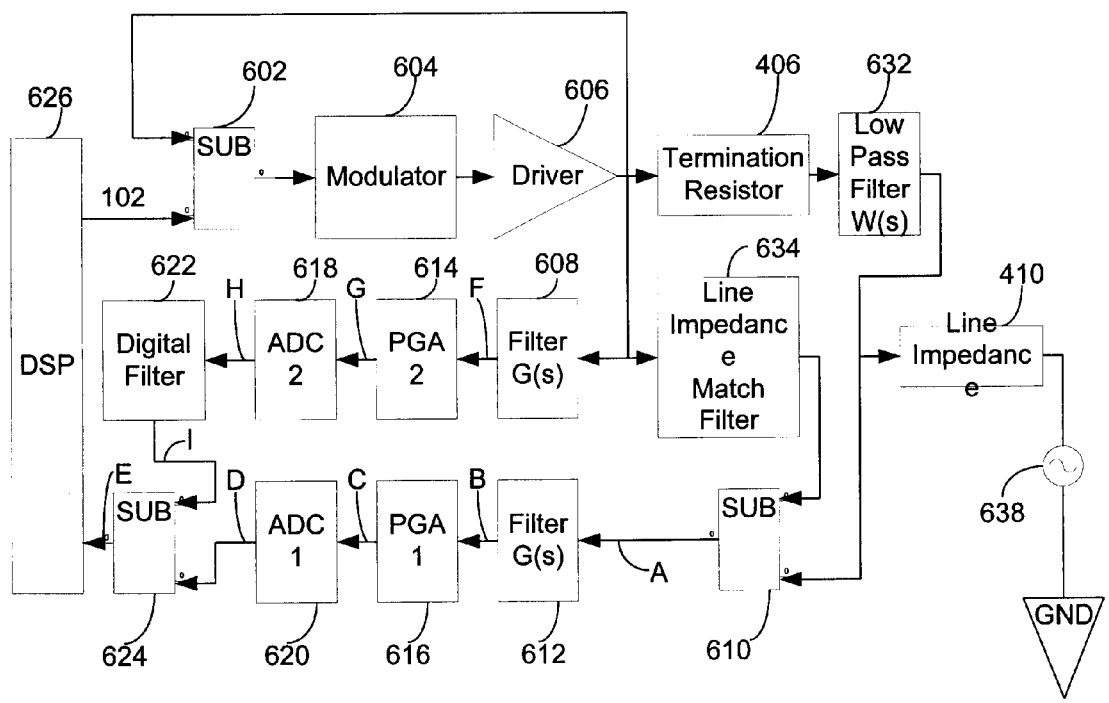
FIG. 6 is a circuit diagram of a line driver according to one preferred embodiment of the invention.

FIG. 6 is a circuit diagram of a line driver according to one preferred embodiment of the invention. The transmitted signal 102 is an input to subtractor 602, which provides an output signal received as an input signal by modulator 604. Modulator 604 provides an output signal that is received as an input signal by line driver 606. The output of line driver 606 is a signal received by termination resistor 406, received by analog filter G(s) 608, received as a subtracted input signal by subtractor 602, and received as an input signal by line impedance match filter 634. The output of termination resistor 406 is an input to low pass filter 632. Low pass filter 632 provides a signal received by line impedance 410. Line impedance 410 also receives a signal from far end signal source 638.

The output of line impedance match filter 634 is subtracted from the output of low pass filter 632 at subtractor 610. Subtractor 610 provides an output signal "A" to the input of analog filter G(s) 612. Analog filter G(s) 608 provides an output signal "F" to an amplifier (most preferably, a programmable gain amplifier PGA2) 614. Analog filter G(s) 612 provides an output signal "B" to the input of another amplifier (most preferably, a programmable gain amplifier PGA1) 616. PGA2 614 provides an output signal "G" to the input of ADC2 618. PGA1 616 provides an output signal "C" to the input of ADC1 620. ADC2 618 provides an output signal "H" received as an input signal by digital filter 622, which produces an output signal "I" received as an input signal to be subtracted by subtractor 624. ADC1 620 also provides an output signal "D" received as input signal by subtractor 624. The output of subtractor 624 provides an error signal "E" to DSP 626.

Although the discussion is directed to a line driver using a Class-D amplifier, other amplifiers (e.g., linear amplifiers) can be used in alternative embodiments of the invention. In the most preferred embodiments, the G(s) filters 608 and 612 are analog filters, and remove the echo from the line and perform anti-aliasing before passing the signals to the PGAs. The G(s) filters 608 and 612 can be of any order, and in general can even be different, but it makes the analysis simpler is the two G(s) filters 608 and 612 are the same. The two PGAs 614 and 616 are set (e.g., programmed) during power up to the optimum level to be received by the ADCs, but other amplifiers besides programmable gain amplifiers can be used in alternative embodiments.

Presently, ADSL requires ADCs with 14 bits of resolution. ADC implementations for this frequency range are easily achievable with 16 bit ADCs. It is also possible to increase the order of the G(s) filters 608 and 612 to decrease the required number of bits in the ADCs 618 and 620.

In an alternative embodiment, the hardware can be simplified by making the digital filter 622 an adaptive filter that is continuously adjusted to the changes in the line. But this is hardly necessary, since once the proper filter is selected, the line is static and the impedance characteristics of the line do not change.

The transfer function equations for the preferred embodiment of the invention shown in FIG. 6 are listed below. Stx is the transmitted signal and Srx is the received far end signal. H(s) is the transfer function of transmitted signal echo. Points A, B, C, D, E, F, G, H, and I are shown in FIG. 6, and have the following transfer function equations:

$A = (S_{tx} + \epsilon_{amp})H(s) + S_{rx}$ $B = G(s) \cdot ((S_{tx} + \epsilon_{amp})H(s) + S_{rx})$ $C = G(s) \cdot K \cdot ((S_{tx} + \epsilon_{amp})H(s) + S_{rx})$ $D = G(s) \cdot ((S_{tx} + \epsilon_{amp})H(s) + S_{rx}) + \epsilon_{ADC1}$ $F = G(s) \cdot H(s) \cdot (S_{tx} + \epsilon_{amp})$ $G = K' \cdot G(s) \cdot H(s) \cdot (S_{tx} + \epsilon_{amp})$ $H = K' \cdot G(s) \cdot H(s) \cdot (S_{tx} + \epsilon_{amp}) + \epsilon_{ADC2}$ $I = W(s) \cdot K'' \cdot (K' \cdot G(s) \cdot H(s) \cdot (S_{tx} + \epsilon_{amp}) + \epsilon_{ADC2})$ $E = D - I$ Assuming the system is adjusted so that $$K=K'\cdot K''$$

$$H(s)=W(s)$$

Then the received signal at point E would be:

$$E=S_{rx}+H(s)\cdot K''\cdot \epsilon_{ADC2}+\epsilon_{ADC1}$$

It is evident from the above equation that the error at point "E" has been increased by the term:

$$H(s)\cdot K''\cdot \epsilon_{ADC2}$$

H(s) is the response of the channel and therefore is a low pass function. In a properly designed system K" is a number less than one. Therefore, the term:

$$|H(s)\cdot K''|\leq 1$$

and $$|H(s)\cdot K''\epsilon_{ADC2}|\leq |\epsilon_{ADC2}|$$

Since the error term are uncorrelated, then the noise of the received signal at point "E" is degraded at most by 3 dB, and the new ADC's need to be improved by 0.5 bits to get the same performance.

Figure 7:
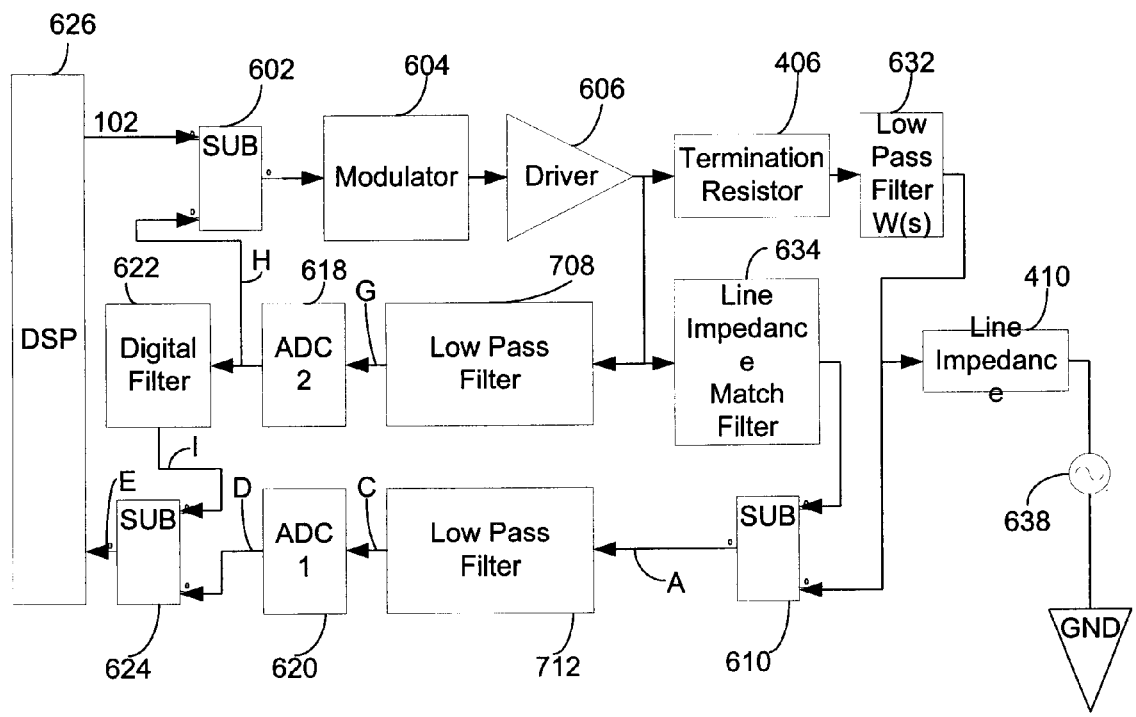
FIG. 7 illustrates an alternative embodiment of the invention, where the loop is closed using an analog-to-digital converter, and the loop filter is implemented by using a low pass filter.

The embodiment of the invention shown in FIG. 6 closes the power driver loop with an analog filter. FIG. 7 illustrates an alternative embodiment of the invention, where the loops are closed using ADCs, and the loop filters are implemented by using low pass filters. However, excessive delay and resulting instabilities in the system can arise, and the performance requirements for the ADCs are more stringent without the amplifiers.

FIG. 7 is almost identical to FIG. 6. The signal 102 is an input to subtractor 602, which provides an output signal received as an input signal by modulator 604. Modulator 604 provides an output signal that is received as an input signal by line driver 606. The output of line driver 606 is received an input signal by termination resistor 406, low pass filter 708, and line impedance match filter 634. Line impedance match filter 634 provides an output subtracted from the output of low pass filter 632 by subtractor 610. Subtractor 610 provides an output signal to the input of low pass filter 712. Low pass filter 708 provides an output signal as an input to ADC2 618, and low pass filter 712 provides an output signal as an input to ADC1 620. ADC2 618 provides an output signal received as a subtracted input signal by subtractor 602; and as an input signal to digital filter 622, which produces an output signal received as an input signal to be subtracted by subtractor 624. ADC1 620 provides an output signal received as input signal by subtractor 624. The output of subtractor 624 provides an error signal to DSP 626. The remainder of the circuit is identical to the circuit in FIG. 6 as discussed above.

Figure 8:
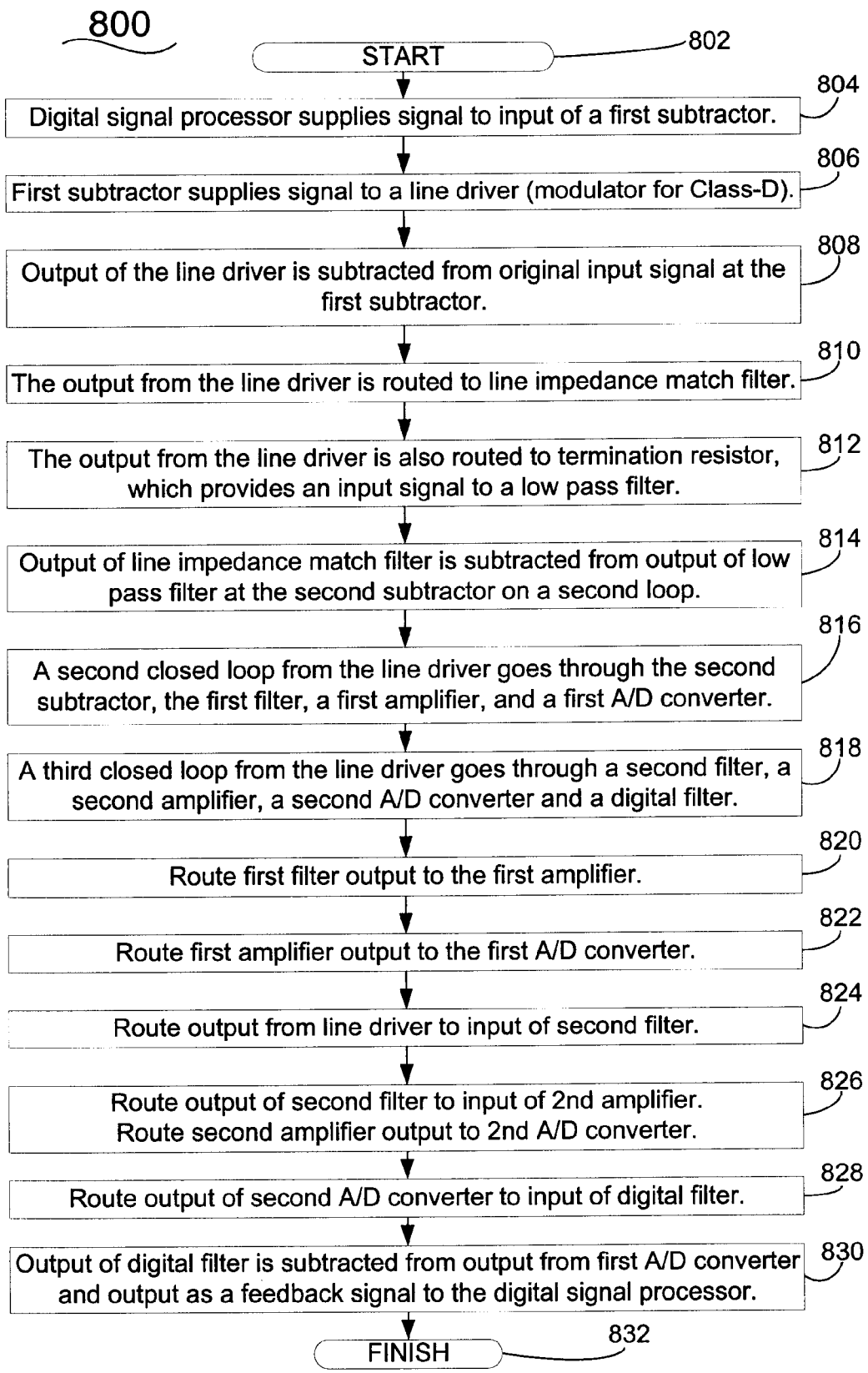
FIG. 8 illustrates a flow chart for a method of making a line driver according to the preferred embodiment of the invention shown in FIG. 6.

FIG. 8 illustrates a flow chart 800 for a method of making a line driver according to one preferred embodiment of the invention shown in FIG. 6. The method starts in operation 802. In operation 804 a digital signal processor supplies an input signal to a first subtractor circuit. In operation 806 the first subtractor circuit supplies an input signal to a line driver (or modulator, in the case of a Class-D line amplifier). In alternative embodiments, other types of amplifiers are used instead of a Class-D amplifier. In operation 808 a first closed loop path at a first subtractor subtracts the output signal of the line driver from the original input signal. In operation 810 the output signal from the line driver is routed as an input to a line impedance match filter. In operation 812 the output signal from the line driver is routed to a termination resistor, which provides an input signal to a low pass filter. In operation 814 the output of the line impedance match filter is subtracted from the output of the low pass filter at a second subtractor, and the output of the second subtractor goes to a first filter. In operation 816 a second closed loop path is connected and includes the second subtractor, the first filter, a first amplifier, and a first analog-to-digital converter. In operation 818 a third closed loop path is connected and includes a second filter, a second amplifier, a second analog-to-digital converter, and a digital filter. In operation 820 the output signal from the first filter is connected to an input port of the first amplifier. In operation 822 the output from the first amplifier is connected to the input of the first analog-to-digital converter. In operation 824 the output signal from the line driver is connected to an input of the second filter. In operation 826 the output signal from the second filter is connected to an input of the second amplifier. Then the output from the second amplifier is connected to the input of the second analog-to-digital converter. In operation 828 the output of the second analog-to-digital converter is routed to the input of the digital filter. In operation 830 a third subtractor subtracts an output signal from the digital filter from an output signal from the first analog-to-digital converter, and the third subtractor circuit outputs a feedback signal to the digital signal processor. The method ends in operation 832.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to increase the power efficiency of a line driver, comprising:

supplying an original input signal from a digital signal processor to a first subtractor circuit;

supplying an output signal from said first subtractor circuit as an input signal to a line driver having an output signal;

providing a first closed loop path to subtract said output signal from said line driver from said original input signal of said first subtractor circuit;

filtering said output signal from said line driver with a termination resistor and a low pass filter;

routing said output signal from said line driver to a line impedance match filter;

providing a second closed loop path including a first analog-to-digital converter and a second subtractor to subtract an output signal from said line impedance match filter from an output signal from said low pass filter;

providing a third closed loop path including a digital filter and a second analog-to-digital converter; and subtracting an output signal of said digital filter from an output signal of said first analog-to-digital converter at a third subtractor circuit to output a feedback signal to said digital signal processor.

2. The method of claim 1, further comprising:

subtracting said output signal of said line driver from said output signal of said low pass filter at a second subtractor circuit; and connecting an output signal from said second subtractor circuit to said low pass filter to produce an output signal from said low pass filter.

3. The method of claim 1, further comprising:
connecting an output signal from a first filter to an input port of a first amplifier having an output signal; and
connecting said output signal of said first amplifier as an input to said first analog-to-digital converter.

4. The method of claim 1, further comprising:
connecting said output signal of said line driver to an input port of a second filter having an output signal;
connecting said output signal from said second filter to an input port of a second amplifier having an output; and
connecting said output from said second amplifier as an input to said second analog-to-digital converter.

5. The method of claim 1, wherein said first amplifier and said second amplifier are programmable gain amplifiers (PGAs), and said line driver is a Class-D line driver.

6. The method of claim 1, wherein said digital filter is an adaptive filter.

7. A line driver circuit, comprising:
a digital signal processor to supply an original input signal to a first subtractor circuit; wherein first subtractor circuit has an output signal;
a line driver having an output signal on an output port and receiving as an input signal said output signal of said first subtractor circuit, wherein a first closed loop path is provided from said output port of said line driver to said first subtractor circuit to subtract said output signal of said line driver from said original input signal;
a line impedance match filter producing an output signal, receiving said output signal of said line driver as an input signal;
a low pass filter having an output signal, receiving said output signal of said line driver as an input signal through a termination resistor;
a second subtractor circuit to subtract said output signal from said line impedance match filter from said output signal received from said low pass filter, wherein said second subtractor provides an input signal to a first analog-to-digital converter;
a first analog-to-digital converter to receive a filtered and amplified input signal from said second subtractor;
a second analog-to-digital converter to receive an filtered and amplified input signal from said line driver;
a digital filter to receive an input signal from said second analog-to-digital converter; and
a third subtractor circuit to subtract an output signal of said digital filter from an output signal of said first analog-to-digital converter, wherein said third subtractor circuit outputs a feedback signal as an input signal to said digital signal processor.

8. The line driver circuit of claim 7, further comprising:
a first filter that produces an output signal and receives as an input signal an output signal from said second subtractor.

9. The line driver circuit of claim 8, further comprising:
a first amplifier having an output signal and receiving as an input said output signal from said first filter, wherein said output signal of said first amplifier is connected as an input signal to said first analog-to-digital converter.

10. The line driver circuit of claim 7, further comprising:
a second filter having an output signal and receiving as an input said output signal from said output port of said line driver;
a second amplifier having an output signal and receiving as an input signal said output signal from said second filter, wherein said output signal from said second amplifier is connected as an input signal to said second analog-to-digital converter.

11. The line driver circuit of claim 7, wherein said first amplifier and said second amplifier are programmable gain amplifiers (PGAs), and said line driver is a Class-D line driver.

12. The line driver circuit of claim 7, wherein said digital filter is an adaptive filter.

13. The line driver circuit of claim 7, wherein said first filter and said second filter comprise a low pass filter.

14. An ADSL system with a line driver, comprising:
a first subtractor having a first input port, a second input port, and an output port producing an output signal;
a digital signal processor to supply an original input signal to said first input port of said first subtractor;
a line driver having an output signal on an output port and receiving an input signal from said output signal of said first subtractor, wherein a first closed loop path is provided from said output port of said line driver to said second input port of said first subtractor;
a line impedance match filter producing an output signal, receiving said output signal of said line driver as an input signal;
a low pass filter having an output signal, receiving said output signal of said line driver as an input signal through a termination resistor;
a second subtractor circuit to subtract said output signal from said line impedance match filter from said output signal received from said low pass filter, wherein said second subtractor provides an input signal to a first analog-to-digital converter with an input port and an output port;
a second analog-to-digital converter with an input port and an output port;
a digital filter with an output port and an input port to receive an input signal from said output port of said second analog-to-digital converter; and
a third subtractor to subtract an output signal from said output port of said digital filter from an output signal from said output port of said first analog-to-digital converter, wherein said third subtractor outputs a feedback input signal to said digital signal processor.

15. The system of claim 14, further comprising:
a first filter that produces an output signal on an output port and receives an input signal from said output port of said second subtractor.

16. The system of claim 14, further comprising:
a first amplifier having an output on an output port and an input port receiving said output signal from said output port of said first filter, wherein said output from said output port of said first amplifier is connected to said input port of said first analog-to-digital converter.

17. The system of claim 14, further comprising:
a second filter having an output signal on an output port and an input port connected to said output signal from said output port of said Class-D line driver;
a second amplifier having an output on an output port and an input port connected to said output signal from said output port of said second filter, wherein said output from said output port of said second amplifier is connected to said input port of said second analog-to-digital converter.

18. The system of claim 14, wherein said first amplifier and said second amplifier are programmable gain amplifiers (PGAs).

19. The system of claim 14, wherein said digital filter is an adaptive filter.

20. The system of claim 14, wherein said first filter and said second filter comprise a low pass filter.

* * * * *